United States Patent [19]

Agro et al.

[11] Patent Number: 5,320,871
[45] Date of Patent: Jun. 14, 1994

[54] UNDERWATER COATING FOR SUBMERGED SUBSTRATES

[75] Inventors: Susan C. Agro, Enfield; Bernard O. Baum, West Hartford; Patrick J. Courtney, Newington, all of Conn.

[73] Assignee: Springborn Laboratories, Inc., Enfield, Conn.

[21] Appl. No.: 894,572

[22] Filed: Jun. 5, 1992

[51] Int. Cl.$^5$ .............................................. C09D 5/08
[52] U.S. Cl. .................... 427/386; 106/14.41; 106/14.42; 106/14.43; 106/14.44; 427/385.5; 252/394; 252/395; 252/396; 524/431; 524/442; 524/449; 524/609; 524/742; 528/373
[58] Field of Search ............... 106/14.41, 14.42, 14.43, 106/14.44, 503; 427/372.2, 385.5, 386; 252/394, 395, 396; 524/609, 742, 431, 442, 449; 528/373

[56] References Cited

U.S. PATENT DOCUMENTS

| | | | |
|---|---|---|---|
| 2,838,419 | 6/1958 | Francis | 117/74 |
| 3,261,880 | 7/1966 | Forestier | 260/736 |
| 3,929,716 | 12/1975 | Komoto et al. | 260/37 |
| 3,990,381 | 11/1976 | Shepard et al. | 114/67 |
| 3,993,707 | 11/1976 | Cummings | 260/830 |
| 4,022,946 | 5/1977 | Cummings | 428/413 |
| 4,075,153 | 2/1978 | Leo | 106/14.44 |
| 4,098,928 | 7/1978 | Noonen et al. | 427/203 |
| 4,147,819 | 4/1979 | Hukumoto et al. | 427/195 |
| 4,260,700 | 4/1981 | Cassutt et al. | 525/113 |
| 4,354,873 | 10/1982 | Supcoe et al. | 106/18.32 |
| 4,410,363 | 10/1983 | Supcoe et al. | 106/18.29 |
| 4,491,654 | 1/1985 | Cummings | 525/490 |
| 4,758,281 | 7/1988 | Eckler et al. | 106/467 |
| 4,835,051 | 5/1989 | Yu | 106/14.44 |
| 4,956,038 | 9/1990 | Morinaga et al. | 156/156 |
| 4,981,946 | 1/1991 | Erhan | 528/229 |

FOREIGN PATENT DOCUMENTS

| | | | |
|---|---|---|---|
| 2839348 | 3/1979 | Fed. Rep. of Germany | 106/14.45 |
| 56-074156 | 6/1981 | Japan | |
| 56-157460 | 12/1981 | Japan | |
| 1306181 | 2/1973 | United Kingdom | C08G 41/00 |
| 2076843 | 12/1981 | United Kingdom | C08L 23/20 |

OTHER PUBLICATIONS

Data sheets for ZL-1612 and ZL-1856, Oct. 24, 1986.
Usmani, "Liquid Polysulfide Polymers and Sealants", Polymer News, 1985, vol. 10, pp. 231-236.
Product Bulletin: "LP Polysulfide Epoxy Systems" (no date).
Product Bulletin: "ELP Epoxy Terminated Polysulfide Polymers" (no date).

*Primary Examiner*—Anthony Green
*Attorney, Agent, or Firm*—Fishman, Dionne & Cantor

[57] ABSTRACT

An underwater coating composition for protecting a submerged steel structure from corrosion includes a base resin selected from the group consisting of an epoxidized polysulfide resin and a mixture of an epoxidized polysulfide resin and an epoxy resin, a moisture barrier pigment and an effective amount of a curing agent suitable for curing the composition while the composition is submerged in water and a method for protecting an underwater structure by coating the structure with the above described coating composition.

11 Claims, No Drawings

UNDERWATER COATING FOR SUBMERGED SUBSTRATES

The U.S. Government may have rights in this invention under contracts DACA 88-85-C-0021 and DACA 88-87-0006 with the Department of the Army.

BACKGROUND OF THE INVENTION

Many structures, e.g. dams, locks, bridge abutments, dock pilings etc., are immersed in either fresh or salt water Replacement of such structures is very difficult and at times impossible due to economic and engineering considerations, yet many of these structures are unprotected from corrosion. In order to prolong the service life of such structures it is desirable to protect said structures from further corrosion. This approach is complicated by the fact that it is not feasible to dewater many of the structures. Therefore, there is a need for a corrosion protective coating which can be applied to steel and other substrates while the substrates are submerged in water. While there are epoxy resin-based underwater coatings which are easy to apply and exhibit good adhesion t said substrate, said coatings exhibit several drawbacks, e.g. tackiness of the coating surface due to incomplete cure, brittleness of the cured coatings and consequent lack of impact resistance, solubility of various elements of the coatings, and leachability of various agents.

The present invention provides a coating composition with the strong adhesion and ease of application associated with the known epoxy based coating compositions but which avoids the drawbacks associated with the known epoxy coating compositions.

SUMMARY OF THE INVENTION

A coating composition for protecting a steel structure or the like from corrosion when submerged in an aqueous fluid, said composition comprising from about 30% by weight to about 65% by weight of a base resin selected from epoxidized polysulfide resins and mixtures of epoxidized polysulfide resin and epoxy resins, an effective amount of a curing agent and from about 7% by volume to about 15% by volume of a barrier pigment selected from the group consisting of mica, glass flakes, stainless steel flakes, wollastonite, and micaceous iron oxide. The coating composition of the present invention is applied to a structure while the structure is submerged in the aqueous fluid, is curable while submerged in the aqueous fluid and provides long term corrosion protection to the submerged structure.

An underwater structure of the present invention includes a steel substrate and a coating layer on the substrate, wherein the coating layer comprises the cured reaction product of the above described coating composition of the present invention.

A method for protecting a structure from corrosion wherein the structure is submerged in aqueous fluid is also disclosed. The method comprises mixing the elements of the above described coating composition of the present invention to form the coating composition and applying the coating composition to the structure under conditions which allow curing of the coating composition.

DETAILED DESCRIPTION OF THE INVENTION

The coating composition of the present invention may be generally characterized as comprising an epoxidized polysulfide resin or a mixture of an epoxidized polysulfide resin and an epoxy resin, a barrier Pigment and a curing agent wherein the present composition has a viscosity of from about 3500–28000 CP at 26° C.

The epoxy terminated polysulfide resin employed in the present invention may be any polysulfide having two or more pendant or terminal epoxy groups thereon. Preferably, said epoxidized polysulfide resin has an epoxy equivalent weight of from about 300 to about 675 and the following general structure formula:

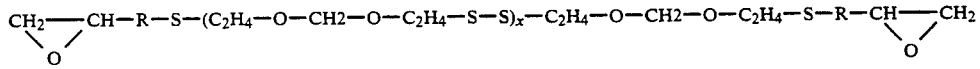

where R is an alkyl radical and x is an integer of from 0 to 10.

Epoxidized polysulfide resins known as ZL-1612 and ZL-1856 which are commercially available from the Morton International, Inc. have been found to be particularly useful in the present invention.

The epoxy resin which may be used in combination with the epoxidized polysulfide resin may be any epoxy resin having two or more epoxy functional groups per molecule. Said epoxy resins generally exhibit an epoxy equivalent weight of from about 160 to about 200, and have the following general formula:

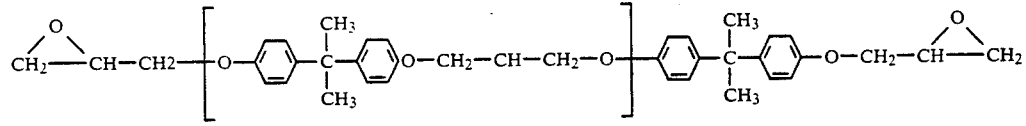

The diglycidylether of bisphenol A has been found to be Particularly well suited for use as the epoxy resin and is commercially available as EPON 828 from Shell Chemical Company.

The curing agents employed in the present invention may be any curing agent or hardener which will react with the epoxy groups of the epoxidized polysulfide resin and the epoxy resin of the coating composition of the present invention while said coating composition is submerged under water. Suitable curing agents or hardeners include aromatic polyamines, modified aliphatic polyamines, amine amide dimer acids and alkylated imidazoles. Examples of such curing agents are HY-850 available from Ciba Geigy Corp, ANACAMINE LO and SUR-WET R available from Pacific Anchor Chemical Corporation.

The barrier pigment used in the coating composition of the present invention may be any barrier pigment which improves the resistance of the substrate, upon which the coating composition is applied, from corroding. Suitable carrier pigments include micaceous iron oxide, mica, glass flakes, stainless steel flakes and wollastonite.

Mica is particularly preferred and is commonly available from a number of companies such as KMG Minerals, Inc., NYCO Division of Processed Minerals, Inc. and Kerr-McGee Chemical Corp.

The above noted general formulations may also include various additives and processing agents such as reactive diluents, air release agents, fillers, coupling agents, etc.

Typical reactive diluents include low molecular weight diluents having one or two functional groups per molecule and are included in the coating composition in amounts up to about 20 parts reactive diluent per 100 parts of the combined epoxidized polysulfide resins and epoxy resins. Suitable reactive diluents are n-butyl glycidyl ether, 1,4-butanedioldiglycidyl ether, alkyl glycidyl ether, etc.

Typical air release agents employed in the coating compositions of the present invention may include any compound which is compatible with the base resin and the curative which functions to force air and/or water out of the coating composition subsequent to application of the composition to the substrate and prior to curing of the applied coating composition. Suitable air release agents include Furane X-Air and Furane Airout produced by Furane, heoalkoxy titanates, etc.

Typical coupling agents include titanates, silanes or zirconates which function to improve the strength of the base resin/barrier pigment interface. Suitable coupling agents include amino functional silanes, alkoxy titanates functional organo-metallic compounds of titanium, silicon or zirconium.

The coating composition of the present invention may be applied to a substrate while the substrate is submerged under water by, e.g. brush, sponge, paint roller or spray gun. Application using an automatic power roller device, e.g. a power roller device commercially available from GRACO, is the preferred method for applying the coating composition of the present invention to large submerged surface areas.

The following table gives representative sample formulations of the coating compositions of the present invention in parts by weight of the present composition unless otherwise noted:

TABLE 1

| | SAMPLE # | | | | | | |
|---|---|---|---|---|---|---|---|
| | 1 | 2 | 3 | 4 | 5 | 6 | 7 |
| THIOKOL ZL-1856 | 50 | 50 | — | — | — | — | — |
| THIOKOL ZL-1612 | — | — | 100 | 100 | 100 | 100 | 100 |
| EPON 828 | 50 | 50 | — | — | — | — | — |
| ARALDITE DY-0203 | — | — | — | 20 | 25 | — | 16 |
| CIBA RD-2 | — | — | — | — | — | 25 | — |
| KMG WWG MICA | 41.6 | — | 34.0 | — | 29.4 | 51 | 31.6 |
| NYCO MICA-COAT 10224 | — | 35 | — | 40 | — | — | — |
| ANACAMINE LO | — | — | 42 | 42 | 42 | 42 | 42 |
| CIBA HY-850 | 65.6 | 55 | — | — | — | — | — |
| KEN REACT NZ 66A | — | — | — | 0.4 | 0.4 | 0.4 | 0.4 |
| FURANE X-AIR | — | 0.5 | — | — | — | — | — |

TABLE 1-continued

| | SAMPLE # | | | | | | |
|---|---|---|---|---|---|---|---|
| | 1 | 2 | 3 | 4 | 5 | 6 | 7 |
| AVERAGE VISCOSITY (CP) | 9000 | 6800 | 28000 | 7500 | 8500 | 10250 | 8200 |

Various samples shown in Table I were subject to a wet adhesion test modelled after ASTM D01.3 whereby the tensile force required to pull off a section of coating was measured. Test samples were prepared by coating 6"× 6"× ⅛" steel panels underwater and then doctoring the surface to a uniform 15 mil thickness. A steel dowel was then imbedded into the surface of the coating immediately after doctoring and an aluminum jig was used to hold the dowel perpendicular to the substrate while the coating cured. All samples were cured while submerged in 50° water. Once cured, the jig was removed and the coating was scribed around the base of each dowel. The samples were then removed from the water and immediately tested for adhesion strength which was evaluated by measuring the force per unit area (psi) required to remove the dowel from the cured substrate. The results of said testing are given in TABLE II.

TABLE II

| SAMPLE # | WET ADHESION (PSI) |
|---|---|
| 1 | 714 |
| 2 | 852 |
| 3 | 740 |
| 4 | 1250 |
| 5 | 995 |
| 6 | 441 |
| 7 | 703 |

Sample formulations 1 – 4 given in TABLE I were subject to salt spray testing in accordance with ASTM B177. In this experiment test panels were coated with the sample formulation and cured underwater at 50° F. The panels were then removed from the water and prepared for testing in accordance with ASTM D1654 (Evaluation of Painted or Coated Specimens Subjected to Corrosive Environments). All panels tested passed the 1300 hours of the test.

A number of additional formulations of the coating composition of the present invention were prepared for testing tensile strength and % elongation.

In the tensile strength and elongation testing, diluted coating compositions containing approximately 0.15 parts of diluent per one part base resin were cast as approximately 2 mil thick films.

The compositions and their test results are given in TABLE III where all figures are in parts by weight unless otherwise noted.

TABLE III

| | SAMPLE # | | | | | |
|---|---|---|---|---|---|---|
| | 8 | 9 | 10 | 11 | 12 | 13 |
| THIOKOL ZL-1856 | 50 | — | — | — | — | — |
| THIOKOL ZL-1612 | — | 100 | 100 | 100 | 100 | 100 |
| EPON 828 | 50 | — | — | — | — | — |
| ARALDITE DY-0203 | — | — | 15 | — | — | — |
| CIBA RD-2 | — | — | — | — | 15 | — |
| ANACAMINE LO | — | 42 | 42 | 45.9 | 48.8 | 45.9 |
| CIBA HY-850 | 65.6 | — | — | — | — | — |
| BYKE CHEMIE BYKE 080 | 0.8 | 0.8 | 0.8 | 0.8 | 0.8 | 0.8 |
| DOW DER 332 | — | — | — | 15 | — | 15 |
| TENSILE | 1844 | 4257 | 4637 | 4683 | 5493 | 7194 |

TABLE III-continued

| | SAMPLE # | | | | | |
|---|---|---|---|---|---|---|
| | 8 | 9 | 10 | 11 | 12 | 13 |
| STRENGTH (PSI) | | | | | | |
| % ELONGATION | 139 | 36 | 23 | 30 | 15 | 10 |
| AVERAGE VISCOSITY (CP) | 4300 | 13000 | 4100 | 5500 | 3200 | 4900 |

The following is an example relating to the preparation of a coating composition formulation of the present invention and its application to a submerged substrate:

A two part (part A and part B) coating composition was formulated:

Part A of the composition included 50 pbw polysulfide resin (Thiokol ZL-1856), 50 pbw epoxy resin (EPON 828) and 35 pbw barrier pigment (Nyco Micacoat 10224). Part A was prepared using a Cowles-type mixer to insure un form dispersion of the barrier pigment in the resin mixture. The viscosity of Part A was 12.000 cp at 26° C.

Part B of the composition consisted of a curing agent (Ciba Geigy HY-850 at 55 pbw) for Part A.

The two parts of the coating composition were mixed and applied underwater to a submerged grit blasted steel surface using a) a sponge-brush and b) a commercially available power Paint roller apparatus manufactured by GRACO.

The two parts of the composition were pumped using a GRACO 3:1 Bulldog FRHC: Part A was pumped using a 10:1 President air motor with a heat circulation loop and 3/8"× 50' hose; Part B was pumped using a 5:1 Monarch air motor with heating loop, a mix manifold and a ½"× 50' hose. Part A was heated to about 130° F., Part B was heated to about 100° F.. The apparatus was operated at outlet pressures of 300 psi (Part A) and 150 psi (Part B) using a 100 psi pressure supply The two parts of the coating composition were mixed using a ⅜"× 36" pipe mixer. The mixed coating composition was fed to a power roller with a ½" nap roller surface and applied to the steel substrate (2'× 2' panels).

The power roller delivered a coating comparable in appearance and uniformity to the sponge brush applied coating.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A coating composition for protecting a structure from corrosion, wherein said structure is submerged in an aqueous fluid, said composition comprising:

a base resin selected from the group consisting of epoxidized polysulfide resin and mixtures of an epoxidized polysulfide resin and an epoxy resins,
a barrier pigment, and
a curing agent for curing the coating compositions while submerged in said aqueous fluid.

2. The coating composition of claim 1, wherein the said base resin is an epoxidized polysulfide resin which is present in said composition in an amount of from about 10% by weight to about 30% by weight.

3. The coating composition of claim 1, wherein said base resin is a mixture of from about 10% by weight to 30% by weight of a epoxidized polysulfide resin and from about 20% weight to about 35% by weight of an epoxy resin.

4. The coating composition of claim 2 whereas said barrier pigment is a member of the group consisting of mica, micaceous iron oxide, flake glass, stainless steel flakes and wollastonite and said curing agent is a modified aromatic amine which is present in an amount which is effective to cure said base resin.

5. The coating composition of claim 3, wherein said barrier pigment is a member selected from the group consisting of mica, micaceous iron oxide, glass flakes, stainless steel flakes and wollastonite and said curing agent is an aromatic amine hardener which is present in an amount which is effective to cure said base resin mixture.

6. The coating composition of claim 4, wherein said barrier pigment is mica and is present in an amount of from about 7% by volume to about 15% by volume.

7. The coating composition of claim 5, wherein said barrier pigment is mica.

8. A method for protecting an underwater structure from corrosion, said method comprising:

applying a layer of a coating composition to said underwater structure, and
curing said composition in place on said structure,
said coating composition comprising a base resin selected from the group consisting of an epoxidized polysulfide resin and a mixture of an epoxidized polysulfide resin and an epoxy resin, a barrier pigment and a curing agent suitable for curing said base resin while underwater.

9. The method of claim 8, wherein said base resin is a mixture of an epoxidized polysulfide resin and an epoxy resin and said curing agent is an aromatic amine hardener.

10. The method of claim 9, wherein said barrier pigment is a member of the group consisting of mica, micaceous iron oxide, glass flakes, stainless steel flakes and wollastonite.

11. The method of claim 10, wherein said barrier pigment is mica.

* * * * *